Dec. 27, 1927.

O. W. THOMPSON

GAUGE

Filed Nov. 3, 1919

1,654,102

2 Sheets-Sheet 1

Witnesses:
W. P. Kilroy
Inventor:
Orville W. Thompson
By Hill & Hill
Attys

Dec. 27, 1927.

O. W. THOMPSON

GAUGE

Filed Nov. 3, 1919

1,654,102

2 Sheets-Sheet 2

Witnesses:
W. F. Kilroy
Harry R. L. White

Inventor:
Orville W. Thompson
By Hill & Hill
Attys.

Patented Dec. 27, 1927.

1,654,102

UNITED STATES PATENT OFFICE.

ORVILLE W. THOMPSON, OF CHICAGO, ILLINOIS, ASSIGNOR TO JAS. P. MARSH & COMPANY, OF CHICAGO, ILLINOIS, A CORPORATION OF ILLINOIS.

GAUGE.

Application filed November 3, 1919. Serial No. 335,356.

My invention belongs to that general class of devices known as gauges and relates particularly to a gauge mechanism which in addition to indicating pressures or vacuum, will control other mechanism for controlling, indicating or signaling purposes. More especially it relates to an improved gauge which will operate in the usual manner but will, in addition, control an electric or similar circuit for the control of other mechanism. The invention has among its objects the production of a device of the kind described, that is simple, convenient, attractive, durable, efficient, accurate and satisfactory for use wherever found applicable. Many other objects and advantages of the construction herein shown and described will be obvious to those skilled in the art, from the disclosure herein given.

To this end my invention consists of the novel construction, arrangement and combination of parts herein shown and described and more particularly pointed out in the claims.

Figure 1:
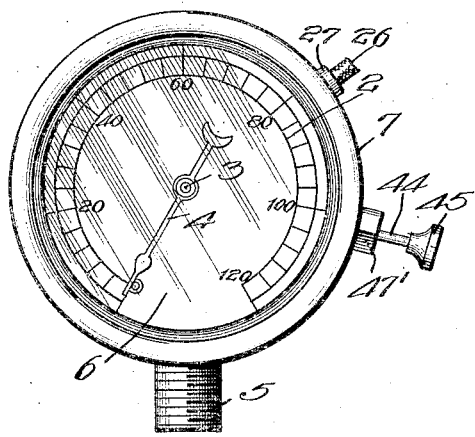
Figure 2:
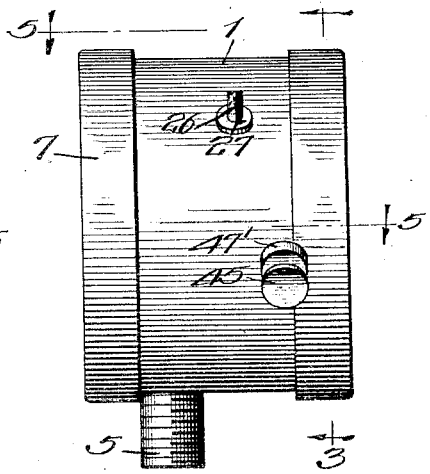
Figure 3:
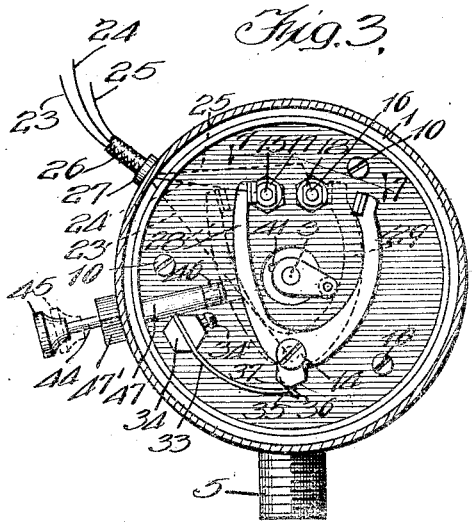
Figure 4:
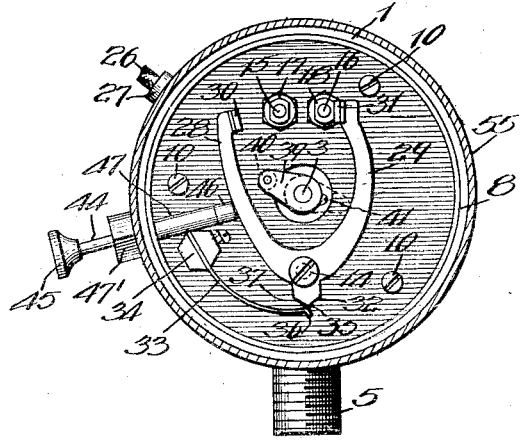
Figure 5:
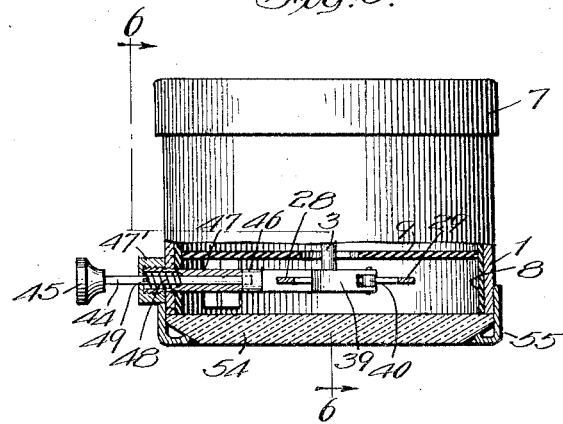
Figure 6:
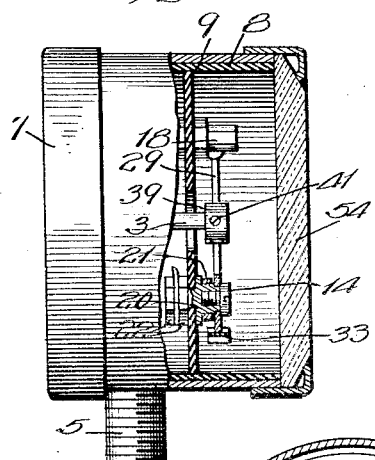
Figure 7:
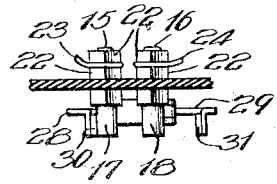
Figure 8:
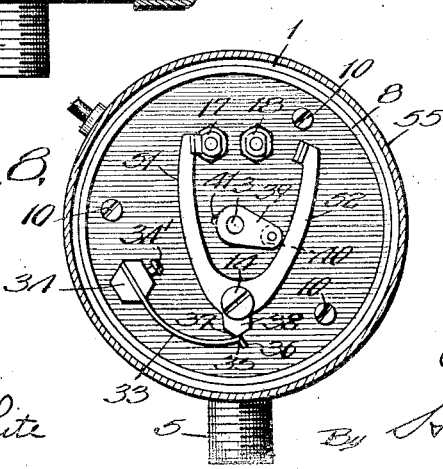

In the drawings, wherein like reference characters indicate like or corresponding parts, Fig. 1 is a front elevation of a gauge embodying my improvement, Fig. 2 is a side elevation of the same, Fig. 3 is a sectional view taken substantially on line 3—3 of Fig. 2, Fig. 4 is a similar view showing the parts in changed positions, Fig. 5 is a sectional view taken substantially on line 5—5 of Fig. 2, Fig. 6 is a sectional view taken substantially on line 6—6 of Fig. 5, Fig. 7 is a sectional view taken substantially on line 7—7 of Fig. 3, and Fig. 8 is a sectional view similar to Fig. 3, showing a modified construction.

Referring to the drawings, 1 represents a suitable casing of the desired size, shape and material carrying a dial member 2, or the equivalent, arranged to co-operate with an indicator 4 mounted on a rotatable shaft 3. The shaft 3 is ordinarily actuated by a Bourdon spring or the equivalent pressure controlled mechanism not shown in detail but of well known construction. The fluid under pressure is admitted through the pipe 5, suitably connected to the system and to the spring which, through suitable mechanism, operates the shaft 3. I have shown the dial covered by a glass plate 6 which may be maintained in place by the retaining member 7. As most clearly shown in Figs. 5 and 6, the casing may be lined with an inner shell 8, preferably of insulating material and divided by a partition 9, preferably of insulating material. The partition 9 is secured in place by screws 10 or the equivalent extending through the plate and engaging with suitable co-operating parts within the casing.

As will be seen, the shaft 3 extends through the partition 9. Arranged on the partition 9 are contact members 17 and 18, having shanks 15 and 16 extending through the partition and forming binding posts for suitable electrical connectors. There is also provided a contact member 20 which is extended through the plate, also forming a binding post and contact member. The same is shown provided with a screw 14 and collar 21 which maintain a switch member 28—29 in place on the member 20. The switch member 28—29, in the construction illustrated, is arranged to cooperate with the contact members 17 and 18 and close a circuit between one or the other of the same and the binding posts 20. As shown, the switch member arms are provided with the offset portions 30 and 31 which afford good contact on the binding or contact members. I have shown conductors 23, 24 and 25 extending to the casing and to the interior where they are connected with the contact members 20, 17 and 18 respectively. In practice these wires may be the usual three-wire conductor or cable and may be insulated as at 27 by a bushing, if desired. The construction in this particular is immaterial in so far as the present invention is concerned and it is immaterial to what apparatus the conductors 23, 24 and 25 are connected or the nature of the apparatus controlled. It may be mentioned, however, that the present devices are particularly desirable for use in connection with automatic refrigerating systems, the same forming a part of the automatic control. The switch member is provided with an extending portion 32 arranged to cooperate with a spring member 33 or the equivalent, having one end secured in a fastening or support 34 by means of a screw 34' or the equivalent. The free end of the spring is provided with a bent portion 36 at the free end, so as to form an edge 35 arranged to cooperate with the two faces 37 and 38 on the part 32. When the switch member is in the position shown in the full lines in Fig. 3, the edge 35 will be in contact with the face 38 and when the switch member is turned to the position indicated by the full lines in Figure 4, it will engage with the face 37. These two faces are inclined or at an angle so that when the switch member is moved from one position to the other, after the edge 35 has reached the point of juncture of the two faces, the switch member by reason of the spring will be quickly snapped into position.

The switch member is controlled or actuated by an arm 39 arranged on the shaft 3 and having a roller 40 or the equivalent arranged to engage with one of the switch arms, or in some cases with either one, as will be hereinafter explained. The same may be secured on the shaft in any desired manner, a screw 41 being shown for the purpose so that the arm, if desired, may be adjusted in the shaft. In the construction of the device shown in Figs. 3 and 4, the arm 39 is arranged to throw the switch member to the position indicated by the dotted lines in Fig. 3 or full lines in Fig. 4, the arms 29, however, being so designed that when the arm 39 is turned back to the position shown in Fig. 3, or some intermediate position between the position shown in the full and dotted lines, it will not throw the switch member. With this particular form of the device, it is necessary to manually return or retrieve the switch member.

Any suitable means may be provided for returning the switch member to its normal position. For the purpose I have shown a plunger rod 44 having an operating button 45, the plunger being provided with a tip 46 preferably of insulating material which will engage arm 28 when the plunger rod 44 is pushed, returning the switch member to its normal position. Obviously, as soon as the same is moved enough for the edge 35 of the spring 33 to pass the point on the extension 32, the spring will complete the retrieving movement. As most clearly shown in Fig. 5, the plunger rod extends through a tube 47 mounted on the casing and is normally maintained in the position shown by a spring 48 which bears against a shoulder in the tube and a pin 49 on the rod. Tube 47 is shown provided with a cap 47'.

The operation of this form of the device may be briefly described as follows: Assuming that the arm 39 is set or secured on the shaft 3 so that normally it is substantially in the position shown in Fig. 3, but will engage with the switch arm 28 when the shaft 3 is rotated sufficient to bring the indicator 4 to a reading, for example, 80 on the dial. When the indicator 4 reaches the reading 80, arm 39 will have engaged switch arm 28 and moved the same to the point where the spring 33 will snap the switch member to the position shown in the dotted lines in Fig. 3 or full lines in Fig. 4. This will break the circuit between conductors 23 and 24 and close a circuit between conductors 23 and 25. The switch member will remain in this position until the button 45 is depressed, retrieving the switch arm to its normal position. Of course if the arm 39 and indicator 4 have not returned to a position permitting the complete retrieving of the switch member, the closing of the circuit as indicated in Fig. 3 will not take place until the arm 39 has moved sufficiently to clear and permit such action. If it is only desired to break a circuit and not simultaneously close another, obviously the arm 29 may be omitted as may contact 18 and conductor 25. If it is desired to have the device automatically controlled on the return of the arm 39, it is only necessary to change the shape of the arm 29 and make it, for example, as illustrated in Figure 8, in which case, when the button 45 and associated parts are employed, the device will be both automatically and manually controlled in so far as retrieving the switch member or returning the parts to normal positions. In Fig. 8 I show a switch member consisting of the arms 51 and 52 and have omitted the manual control. In this case the switch member will work automatically, being controlled by the movements of the arm 39. Obviously with this construction if only one circuit is to be controlled, contact member 18 may be omitted, or if provided, need not be electrically connected to a circuit. With all of the constructions I prefer to provide a glass plate 54 or the equivalent to enclose the mechanism and this may be maintained in place by the collar or flange member 55.

It will be obvious from the preceding description that the arm 39 may be arranged on the shaft 3 or so adjusted as to cause the switch member to be automatically operated at any desired pressure. It may also be mentioned that while I have specified and referred to pressure, the results would be the same in a vacuum gauge in which the same is so constructed that the pointer will register vacuum. Upon rotation of the shaft, this arm 39 would operate in exactly the same manner. Consequently in the claims, where for convenience I use the terms pressure actuated or fluid controlled mechanism as a control for the gauge mechanism, or its condition indicated by the gauge, I wish to be understood as including a vacuum gauge construction as well. While, as before mentioned, the device may be used in connection with any apparatus and any style of gauge, or gauge of any desired capacity, the present device herein described has been found by test to be particularly desirable for use in connection with automatic refrigerating systems. While I have shown two circuits controlled by the device, it will be obvious to those skilled in the art that the same may control one, two or more without materially changing the construction in any way.

Having thus described my invention, it is obvious that various immaterial modifications may be made in the same without departing from the spirit of my invention, hence I do not wish to be understood as limiting myself to the exact construction, arrangement, combination of parts or uses mentioned.

What I claim as new and desire to secure by Letters Patent is:

1. In a device of the kind described and in combination, a casing, indicating mechanism arranged therein and including a movable shaft, a bodily movable switch member arranged in the casing, contact members arranged in the casing, said switch member arranged to engage said contact members and means arranged on said shaft and movable therewith for controlling said switch member to substantially instantaneously disengage from one of said contact members and engage with the other of said contact members.

2. In a device of the kind described and in combination, a casing, a rotatable actuating shaft, contact members provided with means for securing conductors thereto, a bodily movable switch member and means for securing a conductor thereto, yieldable means independent of the switch member for maintaining the same in operative contact with said contact members and means on said shaft for actuating said switch member in a predetermined manner to alternately break the contact at one of said contact members and make it substantially instantaneously at the other.

3. In a device of the kind described and in combination, a casing, a rotatable actuating shaft, a contact member provided with means for securing a conductor thereto, a bodily movable switch member and means for securing a conductor thereto, yieldable means independent of the switch member for maintaining the same in operative contact with said contact member and means on said shaft for actuating said switch member in a predetermined manner to break the contact at said contact member, and means for manually controlling said switch member in a predetermined manner.

4. In a device of the kind described and in combination, a casing, a rotatable actuating shaft, a contact member provided with means for securing a conductor thereto, a bodily movable switch member and means for securing a conductor thereto, yieldable means independent of the switch member for maintaining the same in operative contact with said contact member, means adjustably mounted on said shaft for actuating said switch member in a predetermined manner to break the contact at said contact member, and means operable from the exterior of the casing for manually controlling said switch member in a predetermined manner.

5. In a device of the kind described and in combination, a casing, a rotatable actuating shaft, a plurality of contacts arranged in said casing, a bodily movable switch member arranged to cooperate with said contacts, means on said shaft for actuating said switch member, supplemental means for actuating said switch member after an initial movement thereof, and means for retrieving said switch member as desired.

6. In a gauge of the kind described and in combination, a casing, indicating mechanism arranged therein, including a movable part operatively connected with the indicating mechanism, a plurality of contacts arranged in said casing on one side of said movable member, a switch member pivotally supported for movement bodily within the casing on the opposite side of said member and having arms extending at each side thereof arranged to cooperate with either one of said contact members, means for connecting conductors to said contact members and said switch member, said switch member arranged in the path of said movable member to be moved thereby, and supplemental means for normally maintaining said switch member in contact with one or the other of said contacts and imparting a snap movement to the switch member after an initial movement thereof when actuated by said movable member.

7. In a gauge of the kind described and in combination, a casing, indicating mechanism arranged therein, including an adjustable movable part operatively connected with the indicating mechanism, a plurality of contacts arranged in said casing on one side of said movable member, a switch member pivotally supported within the casing on the opposite side of said member and having arms extending at each side thereof arranged to cooperate with either one of said contact members, said switch member arranged in the path of said movable member whereby the same will be actuated automatically after a predetermined movement of said movable member, and means for normally maintaining said switch member in contact with one or the other of said contacts, and manually operable means for controlling said switch member independently of said movable member.

8. In a gauge of the kind described and in combination, a casing, indicating mechanism arranged therein, including an adjustable movable part operatively connected with the indicating mechanism, a plurality of contacts arranged in said casing on one side of said movable member, a switch member pivotally supported within the casing on the opposite side of said member and having arms extending at each side thereof arranged to cooperate with either one of said contact members, said switch member arranged in the path of said movable member whereby the same will be actuated automatically after a predetermined movement of said movable part and supplemental means for normally maintaining said switch member in contact with one or the other of said contacts and imparting a snap movement to the switch member after an initial movement thereof when actuated by said movable member, and manually operable means for controlling said switch member independently of said movable member.

9. In a device of the kind described and in combination, a casing, pressure indicating mechanism arranged therein, including a dial, an indicator movable thereover and a rotatable shaft for actuating said indicator, circuit controlling mechanism arranged in said casing comprising conducting members and a bodily movable switch member arranged to cooperate therewith and electrically connect said conducting members, an arm on said shaft arranged to engage said switch member upon a predetermined movement of said indicator, yieldable means for normally maintaining said switch member in a desired position and imparting a snap movement thereto after an initial movement thereof by said arm, and means for retrieving said switch member to its normal position.

10. In a device of the kind described and in combination, a casing, pressure indicating mechanism arranged therein, including a dial, an indicator movable thereover and a rotatable shaft for actuating said indicator, circuit controlling mechanism arranged in said casing comprising conducting members and a bodily movable switch member arranged to cooperate therewith and electrically connect said conducting members, an arm on said shaft arranged to engage said switch member upon a predetermined movement of said indicator, means for normally maintaining said switch member in a desired position, and means for retrieving said switch member to its normal position.

11. In a device of the kind described and in combination, a casing, pressure indicating mechanism arranged therein, including a dial, an indicator movable thereover and a rotatable shaft for actuating said indicator, circuit controlling mechanism arranged in said casing comprising conducting members and a movable switch member arranged to cooperate therewith and electrically connect said conducting members, an arm adjustably secured on said shaft arranged to engage said switch member upon a predetermined movement of said indicator, yieldable means for normally maintaining said switch member in a desired position and imparting a snap movement thereto after an initial movement thereof by said arm, and means for retrieving said switch member to its normal position upon the return of said arm to its normal position.

12. In a gauge of the kind described and in combination, a casing, indicating mechanism arranged therein including a dial, an indicator movable thereover, and a rotatable shaft for actuating said indicator, of a plurality of contacts arranged in said casing at one side of said rotatable shaft, a switch member pivotally supported for movement bodily within the casing at the opposite side of said rotatable shaft and having arms extending at each side thereof arranged to cooperate with either one of said contact members, means for connecting conductors to said contact members and said switch member, and actuating means for the switch including a part on said rotatable shaft adapted to engage the switch in the movement of the shaft.

In testimony whereof, I have hereunto signed my name.

ORVILLE W. THOMPSON.